Nov. 17, 1931.  H. F. VIEAU  1,832,825
MACHINE FOR MAKING CATAMENIAL PADS
Filed Feb. 15, 1930    4 Sheets-Sheet 2

Nov. 17, 1931.  H. F. VIEAU  1,832,825
MACHINE FOR MAKING CATAMENIAL PADS
Filed Feb. 15, 1930  4 Sheets-Sheet 3

WITNESS
J. J. Mains

INVENTOR
H. F. Vieau
BY
Denison & Thompson
ATTORNEYS

Patented Nov. 17, 1931

1,832,825

UNITED STATES PATENT OFFICE

HAROLD F. VIEAU, OF LIVERPOOL, NEW YORK, ASSIGNOR TO LUCIUS G. LACEY, OF SYRACUSE, NEW YORK

MACHINE FOR MAKING CATAMENIAL PADS

Application filed February 15, 1930. Serial No. 428,720.

This invention relates to a machine for making catamenial pads of the class set forth in my pending application Ser. No. 428,719, filed, February 15, 1930.

The main object is to provide a simple compact and efficient machine for expeditiously and economically cutting and shaping these pads from a laminated sheet of highly absorbent material preferably composed of a multiplicity of tissue sheets of paper of any suitable length capable of making a relatively large number of the pads in a manner peculiar to this machine in that the sheets are pre-cut in strips corresponding in width to the length of the pads so that when the strip is fed through the machine the pads will be automatically cut to the desired shape and dimensions ready for enclosure in suitable sheathings of gauze or equivalent material which forms a protective shield for the pad and at the same time affords a more tenacious means of attachment of the same to an under garment of the user.

These pads are extremely soft and fluffy and subject to considerable compression under relatively light pressure and are therefore susceptible to disintegration unless the shaping knives are formed in such manner as to avoid such disintegration and one of the specific objects of the present invention is to provide cutter heads with tangential blades of concavo-convex cross section arranged with their convex cutting edges facing in the direction of rotation so that the ends of the pads will be gradually cut to the desired form from the apex to the edges of each cutting blade, the laminated sheet being fed to the cutters in a plane approximately tangential to the peripheries thereof and in a direction parallel with the axis of rotation of the cutters so that both cutters may act simultaneously upon the opposite longitudinal edges of the laminated strip for convexing said edges transversely and concaving the same longitudinally.

Another specific object is to sever the preformed pads from the laminated strip simultaneously with the cutting of succeeding pads.

Other objects and uses relating to the intermittent operation of the web feeding means and the cutting means will be brought out in the following description.

The various moving parts of the machine are mounted upon a main supporting frame —1— comprising upright legs —2— connected at the top by lengthwise bars —3— and cross bars —4—, said lengthwise bars and cross bars being riveted or otherwise secured to each other at their junctions, the lengthwise bars being arranged in spaced parallel relation for a purpose presently described.

An in-feed table —5— and a delivery table —6— are arranged in longitudinally spaced relation above and parallel with the opposite ends of the horizontal frame bars —3—, the delivery table —6— being preferably secured to the upright face of the bars —3— and provided with transverse openings —7— and —8— in longitudinally spaced relation for receiving the pad-forming cutter and the pad-severing cutter hereinafter described. The in-feed table —5— may be supported upon the frame —1— or in any suitable manner not necessary to here illustrate or describe.

The openings —7— in the delivery plate —6— are preferably formed in opposite sides of the inner end thereof for receiving the pad-forming cutters, leaving an intermediate portion of the plate between the openings for the supporting of the adjacent portion of the pad during the forming operation.

The opening —8— consists of a relatively narrow slot extending transversely across the major portion of the width of the delivery plate to receive the severing cutter. See Figures 1 and 2.

A pair of upright guide brackets —9— are bolted or otherwise secured at their lower ends to the outer faces of the intermediate portions of the lengthwise bars —3— to extend upwardly therefrom and are provided on their inner faces with parallel guideways —10— for receiving and guiding a vertically movable carriage or cross head upon which the rotary cutters are mounted in a manner hereinafter described.

A pair of upright U-shaped hangers —11— are bolted or otherwise secured to the opposite lengthwise bars —3— to extend downwardly therefrom in transversely spaced relation with their cross bars at the bottom and extending longitudinally of the frame for receiving and supporting a cross shaft upon which suitable cams are mounted for reciprocating the vertically movable carriage or cross head previously mentioned. See Figures 3 and 4.

An additional upright standard or pedestal —12— may be mounted upon the frame or any other suitable support at one side of the machine and preferably in transverse alignment with the longitudinal centers of the brackets —9— for receiving and supporting parts of the driving mechanisms for the various moving parts of the machine presently described. See Figures 1, 5 and 10.

*Pad forming mechanism*

A rotary cross shaft —13— is journaled in suitable bearings —14— in the lower ends of the U-shaped hangers —11— to extend beyond the outer faces thereof for receiving and supporting a pair of eccentrics —15— which are keyed or otherwise secured to said shaft to rotate therewith and are preferably arranged in vertical alignment with the central portions of the guide brackets —9— as shown more clearly in Figures 2, 3, 4 and 5.

Figure 3:
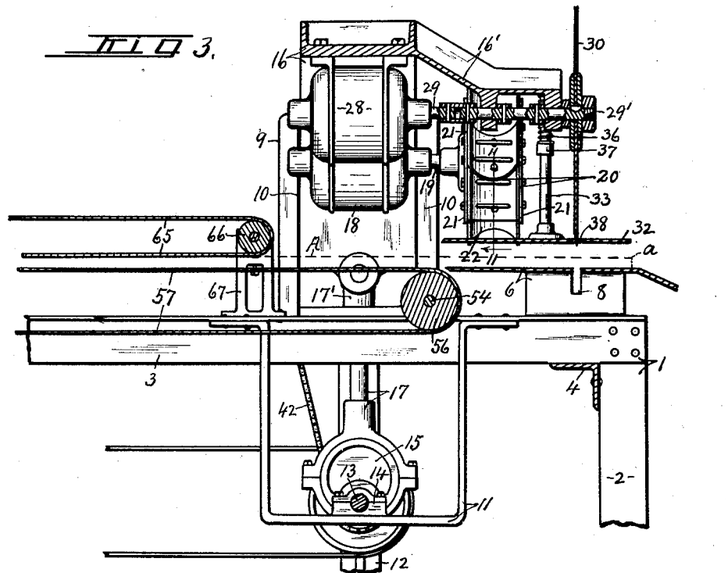
Figures 3, 4, 5 and 6 are vertical sectional views taken respectively on lines 3—3, 4—4, 5—5 and 6—6, Figure 1.
Figure 4:
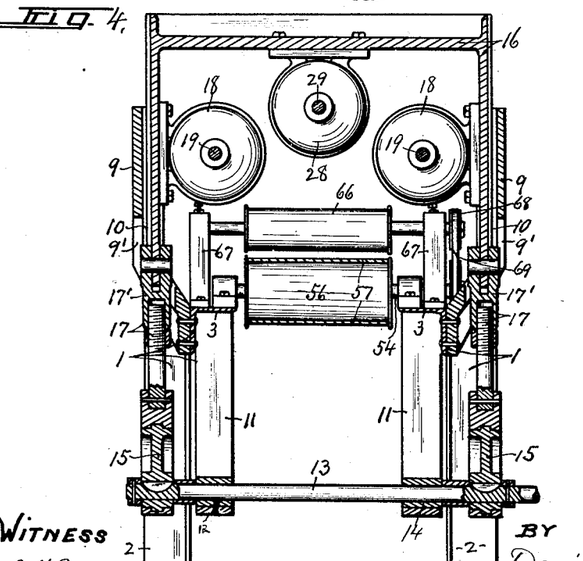

An inverted U-shaped carriage or cross head —16— is reciprocally movable vertically along the guides —10— of the brackets —9— with the upper portion thereof some distance above the upper ends of said brackets and the lower ends of its opposite arms extended through openings —9'— in the brackets and pivotally connected to a pair of pitmen —17— which in turn are mounted upon the peripheries of the eccentrics —15— for transmitting reciprocal motion from the shaft —13— to the cross head or carriage —16— as shown more clearly in Figures 3 and 4.

The pitmen —17— are provided with adjustable sections —17'— for regulating the limits of movement of the cross head or carriage —16—.

A pair of electric motors —18— are bolted or otherwise secured to the inner faces of the opposite pendant arms of the carriage —16— with their armature shafts —19— extending lengthwise of the machine in transversely spaced parallel relation for receiving and supporting a pair of rotary cutter heads —20—.

The motors —18— and cutter heads —20— are supported in a plane above and at opposite sides of the longitudinal center of the top of the frame —1—, the cutter heads being arranged in transverse alignment for simultaneously cutting and forming opposite ends of the pad as the laminated sheet from which the pads are cut is fed to and between the adjacent sides of the lower portions of the cutter along and upon the delivery table —6— which, as previously stated, is provided in its opposite sides with openings —7— for receiving the lower portions of the cutter heads —20— as the latter are moved downwardly to the pad-forming position.

Figure 5:
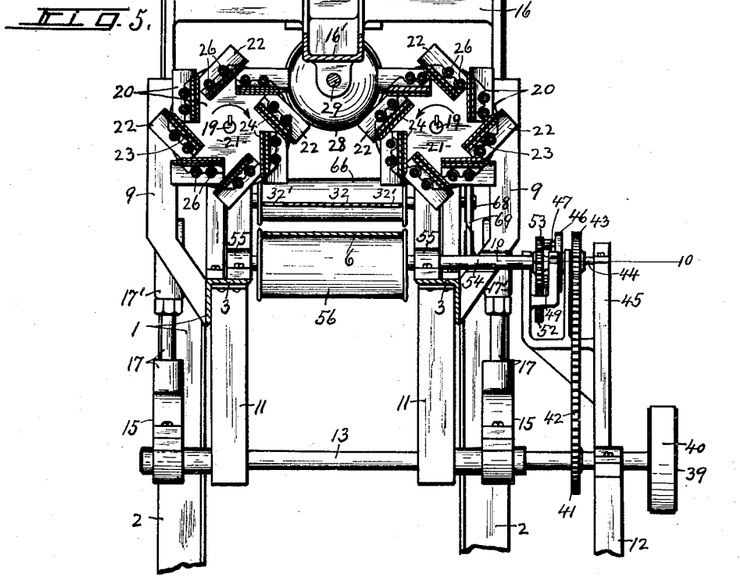
Figures 7, 8, 9, 10, 11, 12, 13:
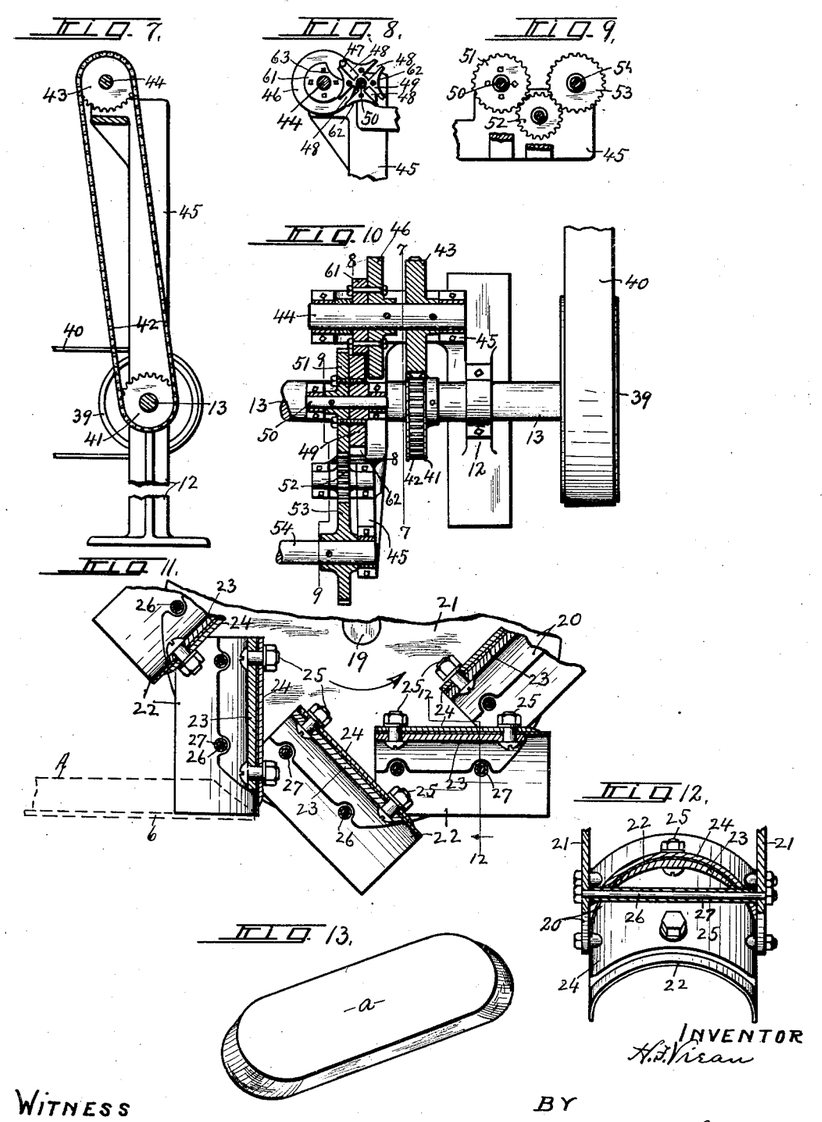
Figures 7, 8 and 9 are detail sectional views taken respectively on lines 7—7, 8—8 and 9—9, Figure 10, except on a slightly reduced scale.
Figure 10 is an enlarged horizontal detail sectional view taken in the plane of line 10—10, Figure 5.
Figure 11 is an enlarged detail sectional view taken in the plane of line 11—11, Figure 3, showing a limited number of the cutting plates in section, the dotted lines indicating the adjacent portion of the laminated strip and underlying support therefor.
Figure 12 is a detail sectional view taken in the plane of line 12—12, Figure 11.
Figure 13 is a perspective view of one of the detached pads formed by the machine.

These cutter heads are identical in construction but are arranged to rotate in reverse directions as indicated by the arrows in Figures 5 and 11 and each comprises a pair of axially spaced circular disks —21— secured to its corresponding motor shaft —19— for receiving between them a plurality of sheet metal cutter blades —22—.

These cutter blades are concavo-convex in cross section and are arranged in uniformly spaced relation tangentially around the axis of the corresponding motor shaft with their convex sides facing in the direction of rotation, the opposite sides of each blade being bolted or otherwise secured to the adjacent disk —21— as shown more clearly in Figures 5, 6, 11 and 12, to assist in holding it in its concavo-convex form.

Associated with each of the concavo-convex blades —22— are relatively rigid inner and outer clamping and reinforcing plates —23— and —24— both of concavo-convex cross section and secured to opposite faces of the cutter blade by bolts —25— or equivalent fastening means to further assist in maintaining the concavo-convex form of the relatively thinner cutting blade —22—, said bolts being passed through registering apertures in the blade —22— and reinforcing plates —23— and —24— as shown more clearly in Figure 11.

The plates —24— are applied to the convex sides of the blades —22— and abut against the inner faces of the adjacent disks —21— to which they are secured by bolts —26— and spacing sleeves —27— for connecting said disks and also to form a properly curved bearing for the convex sides of the cutter blades.

The inner reinforcing plate —23— for each blade is of less transverse width than the outer plate —24— and is engaged with the inner concave face of the cutting blade to assist in maintaining said blade in proper concavo-convex form as shown in Figure 12.

The outer ends of the blades —22— extend some distance beyond the corresponding ends of the reinforcing plates —23— and —24— and also beyond the peripheries of the disks —21— and are disposed at right angles to the central portions of the blades to form cutting edges which are disposed in planes tangential to the axis of the motor shaft —19— with their convex cutting edges facing in the direction of rotation as shown more clearly in Figure 11.

Figure 2:
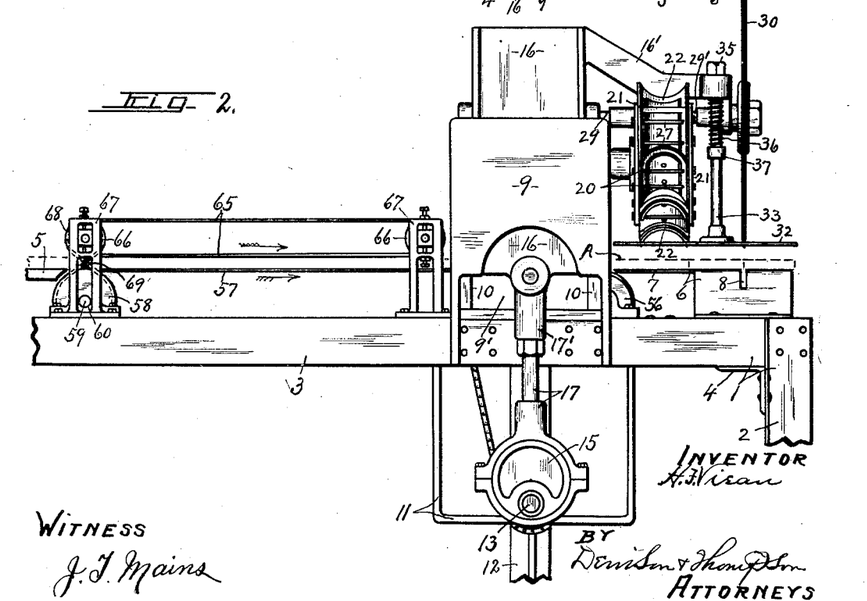
Figure 2 is a side elevation of the same.

The in-feed table —5— and delivery table —6— are disposed in planes substantially tangential to the periphery of the cutter heads —20— and it therefore follows that if a laminated sheet as —A—, shown by dotted lines in Figures 2, 3 and 11, is fed along said plane to and between the cutters —20— the opposite edges thereof in alignment with the cutters will be cut to the shape of the cutting edges of the cutters or convexed transversely and concaved longitudinally to form the ends of the pad as —a— which is subsequently severed transversely from the main body of the laminated sheet as shown in Figure 13.

That is, the laminated sheet is first cut into a strip of any length, the width of which corresponds approximately to the distance between the path of movement of the cutting edges of the cutters —20— in the plane in which the pad is supported during the cutting operation so that the only work required by the cutters is to produce the desired transverse convexity and longitudinal concavity of both ends of the pad.

This cutting operation is produced while the laminated sheet is at rest at which time the cutter heads are moved downwardly to their cutting positions by the corresponding movement of the carriage or cross head —16— through the medium of the eccentrics —15— and pitman connections —17— with the cross head.

Immediately following this cutting operation the cross head —17— with the cutter heads thereon is elevated and the laminated sheet from which the ends of the pad have been previously formed is advanced endwise a sufficient distance to bring the nearest succeeding portion of the laminated sheet into registration with the cutters and at the same time a pre-formed pad at the forward end of the sheet is brought into position to be severed from the sheet thus ending the formation of the pad, these intermittent operations being repeated to the end of the laminated strip and upon other strips as the latter are successively fed into the machine.

*Pad severing means*

A third electric motor —28— is bolted or otherwise secured to the underside of the top portion of the carriage or cross head —16— midway between the opposite sides thereof or directly over the longitudinal center of the machine with its armature shaft —29— extending parallel with the motor shafts —19— as shown more clearly in Figures 3, 4 and 5, said armature shaft being provided with a co-axial extension —29'— coupled thereto and journaled in suitable bearings in a bracket —16'— which extends longitudinally from the upper portion of the carriage —16— in the direction of feed of the laminated sheet —A—.

This extension —29'— carries at its outer end a rotary cutter disk —30— adapted to rotate therewith for severing the pads from the laminated sheet after the ends thereof have been properly formed by the cutters —20—, said cutter disk —30—being reciprocally movable vertically with the carriage —16— and therefore simultaneaous with the vertical reciprocal movement of the cutters —20—.

The cutter disk —30— is arranged to rotate in a plane a distance from the adjacent ends of the cutters ——20— corresponding approximately to the axial width of the concavo-convex cutting blades —22— so as to register with the forward edge of a pad, the ends of which have been previously formed by the cutters —20— for severing the nearest preceding pad simultaneously with the cutting of the ends of the nearest succeeding pad, the severed pads being fed forwardly after each cutting operation to be discharged from the end of the delivery table —6—.

In order that the cutting disk —30— may cut entirely through the laminated pad from side to side the delivery table —6— is provided with a transverse vertical slot —8— adapted to receive the lower portion of the cutting disk —30— while the opposite end walls of the slot serve to hold the pad close to the end faces of the cutter for shearing cooperation therewith. See Figure 3.

Figure 6:
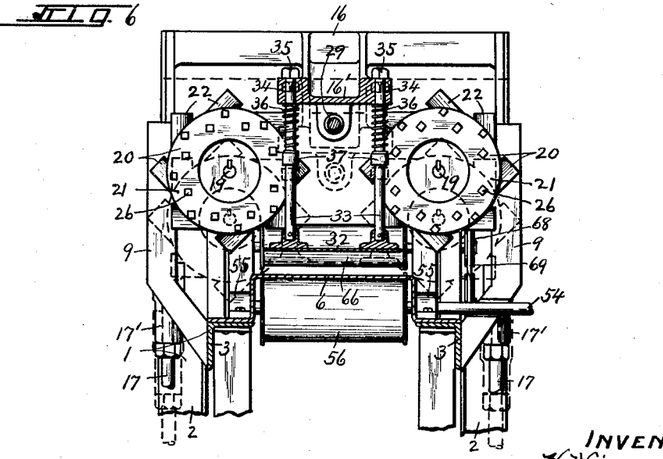

Suitable means is provided for holding the forward end of the laminated sheet —A— upon the delivery table —6— as the cutters —20— and —30— are moved to and from their cutting positions and for this purpose I have provided a pressure plate —32— mounted upon the lower ends of a pair of upwardly extending rods —33— as shown more clearly in Figures 3 and 6, the upper ends of said rods being guided in openings —34— in the extension bracket —16'— and provided with stop shoulders —35— adapted to engage the upper face of said bracket for limiting the relative downward movement of the pressure plate —32— while permitting relative upward movement of said plate against the action of a pair of coil springs —36— which are interposed between the underside of the bracket —16— and suitable shoulders —37— on the rods —33— as shown more clearly in Figure 6.

The opposite longitudinal edges of the pressure plate —32— in alignment with the cutters —20— are cut away at —32'— to avoid contact of the cutters therewith, said plate being also provided with a transverse slot —38— for receiving the lower portion of the cutting disk —30— to avoid contact between the cutter disk and pressure plate.

It is now evident that the cutters —30— and —20— together with their operating means and the presser plate are mounted upon the carriage —16— to move vertically therewith during each cycle of rotation of the eccentrics —15—.

The shaft —13— carrying both eccentrics —15— is extended some distance beyond one side of the frame —1— and journaled in a bearing upon the standard —12—, the outer end of said shaft being provided with a pulley —39— adapted to be connected by a belt —40— to any available source of power for effecting continuous rotation of the cam shaft —13— and its eccentrics —15— and incidentally reciprocating the cross head —16— and mechanisms carried thereby at each revolution of the cam shaft.

*Web feeding means*

The cam shaft —13— is provided with a sprocket wheel —41— connected by a belt —42— to a superposed sprocket wheel —43— which in turn is mounted upon a stub shaft —44— parallel with the shaft —13—.

This stub shaft is journaled in suitable bearings on the upper end of the post —45—, which is secured to and forms a continuation of the standard —12— as shown more clearly in Figures 2 and 10, and is provided with a disk —46— having an eccentrically disposed axially extending pin —47— adapted to engage in each of a series of four slots —48— of a cam disk —49— which is mounted upon another stub shaft —50— parallel with the shaft —44— and preferably in a plane directly over the drive shaft —13— as shown in Figure 10.

The slots —48— in the disk —49— are radial to the axis of the stub shaft —50— and arranged in uniformly spaced relation circumferentially with their outer ends open to permit the pin —47— to enter and leave the slots as the disk —46— is rotated. See Figure 8.

The pin —47— is adapted to engage in one of the slots —48— at each revolution of the disk —46— for intermittingly rotating the disk —49— and shaft —50— one-quarter of a revolution at a time during each quarter revolution of the disk —46—, the disk —49— being at rest during the remaining three-quarters of a revolution of the disk —46—.

As illustrated the sprocket wheels —41— and —43— are of uniform radius and therefore the shaft —44— will be driven at the same rate of speed as the driving shaft —13— while the shaft —50— will be intermittingly driven one-quarter revolution during each revolution of the shaft —44— through the medium of the pin and slot connections between the disks —46— and —49— as previously explained.

This intermittent angular movement of the shaft —50— is utilized in a manner presently described for effecting an intermittent forward feed of the web —A— to the cutters —20— and —30— and for this purpose the slotted disk —49— is bolted or otherwise secured to a co-axial gear —51— which in turn is secured to the shaft —50— and is connected by gears —52— and —53— to a cross shaft —54— for transmitting intermittent rotation to said cross shaft at each revolution of the shafts —13— and —44—. See Figures 8, 9 and 10.

Figure 1:
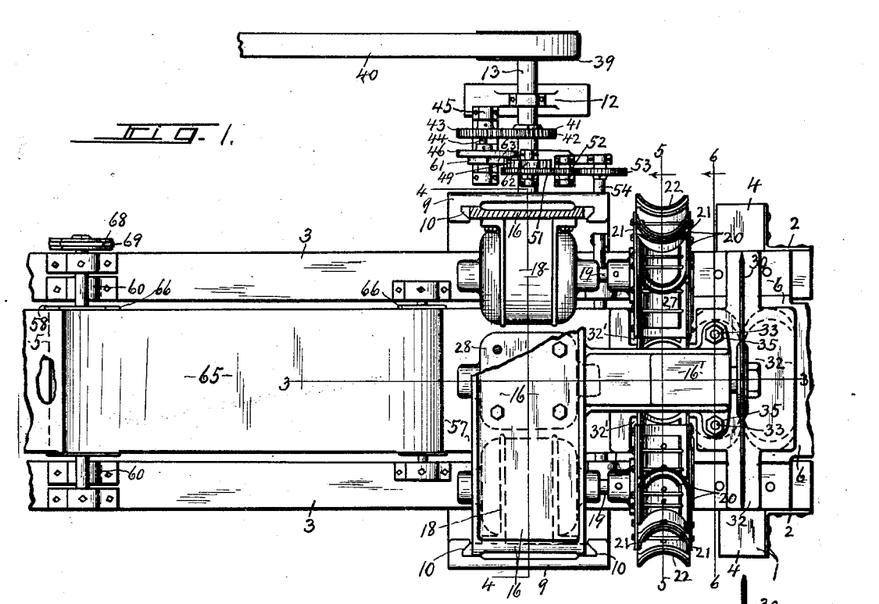
Figure 1 is a top plan of a pad forming machine embodying the various features of my invention.

The cross shaft —54— extends across the top of the frame —1— and is journaled in suitable bearings —55— on the opposite side bars —3— of said frame, the outer end of said shaft being journaled in the upper portion of the post —45— as shown more clearly in Figures 1, 9 and 10.

A belt-supporting drum —56— is secured to the cross shaft —54— between the lengthwise side bars —3— of the main supporting frame and is connected by an endless belt —57— to a similar drum —58— which in turn is mounted upon a cross shaft —59— parallel with the shaft —54—, the shaft —59— being journaled in bearings —60— on the adjacent portions of the lengthwise frame bars —3—.

The drum supporting shafts —54— and —59— and drums —56— and —58— mounted thereon are arranged in longitudinally spaced relation lengthwise of the machine so as to support the upper side of the belt —57— in substantially the same horizontal plane as and between the adjacent ends of the infeed table —5— and delivery table —6— as shown more clearly in Figures 1 and 2, for feeding the laminated web —A— from the table —5— onto the table —6— and across the planes of rotation of the cutters —20— and —30— when the latter are in their uppermost positions shown in Figures 2 and 3.

It is now evident that the intermittent rotation of the shaft —50— through the medium of the pin and slot connections between the disks —46— and —49— will effect a similar intermittent rotation of the cross shaft —54— and drum —56—, the driving connections between the shafts —50— and —54— being arranged to move the belt —57— in the direction indicated by the arrow —x— a distance corresponding to the width of the cutting edges of the cutter blades —22— of the cutter heads —20— or a distance corresponding to that between the severing disk —30— and plane of rotation of the adjacent ends of the cutter heads —20—.

In order that this intermittent longitudinal movement of the belt —27— may be accurately limited a bearing disk —61— is bolted or otherwise secured to the outer end face of the pin supporting disk —46— coaxial therewith, the periphery of the major portion of said bearing disk being concentric with the axis of the shaft —44— to be engaged by concave faces —62— on the perimeter of the disk —49— between the slotted portions of said disk, the radii of the concave portion —62— being substantially equal to the radius of the circular periphery of the bearing disk —51—.

This concaving of the disk —49— at regular intervals throughout its circumference forms a corresponding number of arms in which the slots —48— are cut and in order that the disk —49— may be rotated by the engagement of the pin —47— in said slots a portion of the periphery of the bearing disk —61— is cut away at —63— to receive the outer ends of the slotted arms as the arms are successively registered therewith.

That is, as soon as the pin —47— leaves one of the previously engaged slots by the rotation of the disk —46— in the direction indicated by the arrows one of the concave faces —62— will engage the periphery of the disk —61— to hold the disk —49— against further rotation until the pin has completed approximately three-quarters of a revolution to engage in the next succeeding slot —48— for effecting another quarter revolution of the disk —49— and resultant forward movement of the upper side of the belt —57—, this intermittent operation of the shaft —50— and feeding belt —57— being repeated at each revolution of the disk —46—.

The rotation of the eccentrics —15— for reciprocating the cross head —16— and cutters carried thereby and also the rotation of the shaft —50— are timed in such manner that the cross head will be in its uppermost position with the cutters out of engagement with the laminated web —A— when the feeding belt —57— is operated to feed the web into position to be engaged by the cutters while on the other hand when the cross head is being depressed by the continued rotation of the eccentrics —15— the shaft —50— and feeding belt —57— will be at rest, these operations being repeated at regular intervals for producing the desired formation of the ends of the pads —a— and for severing the same from the web until the latter is converted into the required pads —a—.

The feeding of the laminated web by the belt —57— is aided by a supplemental belt —65—, Figures 1 and 2, said supplemental belt being mounted upon the supporting drums —66— which in turn are mounted for vertical movement in upright standards —67—, Figure 2, for supporting the belt —65— in a plane parallel with the upper side of the belt —57— with the lower side of the belt —65— in spaced relation to the upper side of the belt —57— just sufficient to engage the upper surface of the laminated web —A— for holding the web flatwise against the upper side of the belt —57— and permitting its lower side to move in the same direction.

The supporting shaft for the upper left-hand drum —66—, Figure 2, extends beyond one side of the main supporting frame and is provided with a pulley —68— which is connected by a belt —69— to a corresponding pulley on the supporting shaft —59— for the underlying drum —58— whereby the rotary motion of the drum —58— will be transmitted to the corresponding drum —66— and thence to the supplemental belt —65— for moving the lower side of the latter in the same direction as that of the upper side of the belt —57—.

The electric motors —18— and —28— may be electrically connected through the medium of a switch or switches to any available source of current supply and are adapted to drive their respective cutters at relatively high rates of speed independently of the driving means for the conveyor belts —57— and —65— for the laminated web —A—.

*Operation*

The laminated web —A— which has been previously cut to a width corresponding to the length required for the pads —a— is fed along the receiving table —5— between the adjacent sides of the belts —57— and —65— which are intermittingly operated to feed the forward end of the strip between the lower portions of the cutters —20— while the cross head —16— with the cutters —20— and —30— thereon are elevated to the position shown in Figures 2 and 3.

The feeding belts are then brought to rest while the cross head —16— with the cutters —20— and —30— thereon are moved downwardly to their cutting positions by the continued rotation of the eccentrics —15— thereby causing the cutters —20— to form the opposite ends of the section of the web which is to form one of the pads —a—, the cross head being then returned upwardly to its uppermost position whereupon the belts are again operated to feed the web forwardly into position to permit the cutting of the ends of the next succeeding pad leaving the previously cut pad still united to the main body of the web.

The operation of the web feeding belt then again ceases followed by the downward movement of the cross head to effect the cutting of the ends of the second or next succeeding pad.

A repetition of these alternate and successive operations brings the lefthand edge of the pad into registration with the cutter —30— so that when the cross head is depressed the cutter —30— will sever the first formed pad from the laminated strip simultaneously with the operation of the cutters —20— to concave and convex the ends of another succeeding pad, thus leaving one preformed pad between the cutter —30— and adjacent end of the cutters —20—.

At each downward movement of the cross head —16— the presser plate —32— is brought into holding engagement with the upper surface of the underlying portion of the web slightly before the cross head reaches the limit of its downward movement thereby causing the upper ends of the rods —33— to slide in their respective openings in the bracket —16'— against the action of the springs —36—, this yielding pressure of the plate —32— upon the pad being maintained during a part of the downward movement of the cross head or until the bracket —16'— engages the undersides of the shoulders —35— on the upper ends of the rods —33— at which time the presser plate will be raised away from the underlying web to permit the succeeding forward movement of the web by the belts —57— and —65—.

This intermittent feed operation of the web feeding belts is controlled and regulated by the pin and slot connections between the disk —46— and —49— in the manner previously explained.

The mechanism shown and described is particularly simple, practical and efficient for producing the particular form of pad required but obviously various changes may be made in the structural details without departing from the spirit of the invention.

What I claim is:

1. In a machine for making catamenial pads from a laminated sheet of absorbent material, a rotary cutter having a peripheral cutting edge of concavo-convex cross section and its convex side facing in the direction of rotation, means for bringing one edge of the sheet and cutting edge of the cutter into cutting relation, and means for supporting the sheet during the cutting operation.

2. In a machine for making catamenial pads from a laminated sheet of absorbent material, a pair of similar rotary cutters having parallel axes and arranged in transversely spaced relation, said cutters having peripheral cutting edges of concavo-convex cross section and their convex side facing in the direction of rotation, means for bringing the cutting edges of both of the cutters and opposite edges of the sheet into cutting relation, and means for supporting the sheet during the cutting operation.

3. In a machine for making catamenial pads from a laminated sheet of absorbent material, a rotary cutter having its cutting edge concavo-convex in cross section and its convex side facing in the direction of rotation, means for bringing one edge of the sheet and cutting edge of the cutter into cutting relation, and means for supporting the sheet in a plane approximately tangential to the arc of movement of said cutting edge during the cutting operation.

4. In a machine for making catamenial pads from a laminated sheet of absorbent material, a pair of similar cutters rotatable about parallel axes in transversely spaced relation and having their cutting edges concavo-convex in cross section and their convexed sides facing in the direction of rotation, means for bringing both edges of the sheet and both cutting edges of the cutters into cutting relation, and means for supporting the sheet in a plane approximately tangential to the arcs of movement of said cutting edges for convexing the edges of the sheet transversely and concaving the same longitudinally.

5. In a machine for the purpose described, a rotary cutter having peripheral cutting edges concavo-convex transversely of the plane of rotation and arranged with their convex sides facing in the direction of rotation.

6. In a machine for the purpose described, a rotary cutter having peripheral cutting edges concavo-convex transversely of the plane of rotation and arranged with their convex sides facing in the direction of rotation, all portions of each cutting edge being disposed in a plane intersecting its arc of rotation.

7. In a machine for the purpose described, a rotary cutter having a plurality of cutter blades arranged in uniformly spaced relation tangentially about the axis of rotation and concavo-convex in cross section, the cutting edges being disposed in planes intersecting their respective arcs of rotation.

8. In a machine for the purpose described, a rotary cutter having peripheral cutting edges concavo-convex transversely of their respective planes of rotation and arranged with their convex sides facing in the direction of rotation, said cutting edges being disposed in planes intersecting their respective arcs of rotation.

In witness whereof I have hereunto set my hand this 8th day of February 1930.

HAROLD F. VIEAU.